US008249641B1

(12) United States Patent
Khanka et al.

(10) Patent No.: US 8,249,641 B1
(45) Date of Patent: Aug. 21, 2012

(54) METHOD AND SYSTEM FOR SELECTING CONTROL PARAMETERS BASED ON A RECEIVER SENSITIVITY OF A MOBILE STATION

(75) Inventors: Bhagwan Khanka, Lenexa, KS (US); Sachin R. Vargantwar, Overland Park, KS (US); Jasinder P. Singh, Olathe, KS (US); Ashish Bhan, Shawnee, KS (US)

(73) Assignee: SPRINT Spectrum L.P., Overland Park, KS (US)

( * ) Notice: Subject to any disclaimer, the term of this patent is extended or adjusted under 35 U.S.C. 154(b) by 536 days.

(21) Appl. No.: 12/424,335

(22) Filed: Apr. 15, 2009

(51) Int. Cl.
*H04B 7/00* (2006.01)

(52) U.S. Cl. ........................................ 455/522; 455/517

(58) Field of Classification Search .................. 455/522, 455/513, 500, 507, 406, 450
See application file for complete search history.

(56) References Cited

U.S. PATENT DOCUMENTS

| 6,072,778 | A | * | 6/2000 | Labedz et al. ................ 370/252 |
| 6,101,179 | A | | 8/2000 | Soliman |
| 6,147,987 | A | * | 11/2000 | Chau et al. .................... 370/352 |
| 6,519,236 | B1 | | 2/2003 | Haartsen et al. |
| 6,748,196 | B2 | | 6/2004 | Lee et al. |
| 7,194,281 | B2 | * | 3/2007 | Peng et al. .................... 455/522 |
| 7,508,778 | B2 | * | 3/2009 | Yafuso ........................... 370/282 |
| 7,680,174 | B2 | * | 3/2010 | Tiedemann et al. .......... 375/141 |
| 2005/0124369 | A1 | * | 6/2005 | Attar et al. .................... 455/522 |
| 2005/0197080 | A1 | * | 9/2005 | Ulupinar et al. .............. 455/135 |
| 2007/0275722 | A1 | | 11/2007 | Thorson et al. |
| 2009/0006699 | A1 | * | 1/2009 | Rofougaran .................. 710/304 |

FOREIGN PATENT DOCUMENTS

EP    2192808    *    2/2010

OTHER PUBLICATIONS

U.S. Appl. No. 12/137,833, filed Jun. 12, 2008, titled "Method and System for Power Level Adjustment of Forward Channels".

* cited by examiner

*Primary Examiner* — Peguy Jean Pierre

(57) ABSTRACT

During a communication session, a first BTS transmits a first forward link signal that is received by a first mobile station, a second BTS transmits a second forward link signal that is received by a second mobile station, the first mobile station transmits a first reverse link signal that is received by the first BTS, and the second mobile station transmits a second reverse link signal that is received by the second BTS. One or more control parameters for the forward and/or reverse link signals are selected based on a receiver sensitivity of the first mobile station and/or second mobile station. In one example, a target error rate of the first reverse link signal and a maximum transmit power level of the second forward link signal are selected based on the receiver sensitivity of the second mobile station.

21 Claims, 2 Drawing Sheets

US 8,249,641 B1

METHOD AND SYSTEM FOR SELECTING CONTROL PARAMETERS BASED ON A RECEIVER SENSITIVITY OF A MOBILE STATION

BACKGROUND

Wireless telecommunications networks often use procedures for controlling the signal quality and transmit power levels of forward link signals (i.e., signals transmitted from a base station to a mobile station) and/or reverse link signals (i.e., signals transmitted from a mobile station to a base station).

For example, in a code division multiple access (CDMA) network, the wireless service provider typically sets a target frame error rate (FER) in order to specify a desired signal quality of forward link and/or reverse link signals. Thus, the target FER may be used as a quality control parameter to control the signal quality of forward link and/or reverse link signals. Typically, the same target FER is used for all mobile stations being served by the wireless service provider in a given area. If the actual FER rate in a received forward link or reverse link signal is above the target FER, then the transmit power level of the signal may be increased. If the actual FER in the received signal is below the target FER, then the transmit power level of the signal may be decreased. In this way, the transmit power level of a forward link or reverse link signal may be increased or decreased (typically within minimum and maximum transmit power levels set by the wireless service provider) so as to achieve the signal quality represented by the target FER.

The control of transmit power levels to achieve a target FER may occur through an "inner loop" process and an "outer loop" process. In a conventional "inner loop" process, a receiving device receives a wireless signal transmitted by a transmitting device. The receiving device periodically assesses the strength of the received signal, such as by determining the signal-to-noise ratio (SNR), and compares the observed value to a setpoint. If the observed value is lower than the setpoint, the receiving device instructs the transmitting device to increase the transmit power of the wireless signal. If the observed value is higher than the setpoint, the receiving device instructs the transmitting device to lower the transmit power of the wireless signal.

In a conventional "outer loop" process, the receiving device periodically measures an observed FER in the received signal and compares the observed FER to a target FER. The receiving device may adjust the setpoint used for power control based on the comparison between the observed FER and the target FER. If the observed FER is higher than the target FER, the receiving device may increase the setpoint, which may lead to a corresponding increase in the transmit power level via the "inner loop" process. If the observed FER is lower than the target FER, the receiving device may decrease the setpoint, which may lead to a corresponding decrease in the transmit power level via the "inner loop" process.

OVERVIEW

In a first principal aspect, an exemplary embodiment provides a method for a communication session between a first mobile station and a second mobile station, wherein the first mobile station transmits a first reverse link signal and receives a first forward link signal and the second mobile station transmits a second reverse link signal and receives a second forward link signal. A receiver sensitivity of the second mobile station is determined. At least one quality-control parameter is selected based on the receiver sensitivity, wherein the at least one quality-control is used to control a signal quality of the first reverse link signal. At least one power-control parameter is selected based on the receiver sensitivity, wherein the at least one power-control parameter is used to control a power level of the second forward link signal.

In a second principal aspect, an exemplary embodiment provides a method for a communication session between a first mobile station and a second mobile station, wherein the first mobile station transmits a first reverse link signal and receives a first forward link signal and the second mobile station transmits a second reverse link signal and receives a second forward link signal. A second-mobile receiver sensitivity of the second mobile station is determined. A first-reverse-link parameter is selected based on the second-mobile receiver sensitivity. A signal quality of the first reverse link signal is controlled based on the first-reverse-link parameter.

In a third principal aspect, an exemplary embodiment provides a wireless telecommunications network comprising: a first base transceiver station (BTS) for transmitting a first forward link signal to a first mobile station and receiving a first reverse link signal from the mobile station during a communication session between the first mobile station and a second mobile station; a second BTS for transmitting a second forward link signal to the second mobile station and receiving a second reverse link signal from the mobile station during the communication session; and a controller for controlling at least one of the first and second BTSs. The controller is configured to select, based on a receiver sensitivity of the second mobile station, at least one quality-control parameter for controlling a signal quality of the first reverse link signal.

DETAILED DESCRIPTION OF EXEMPLARY EMBODIMENTS

1. Introduction

Figure 1:
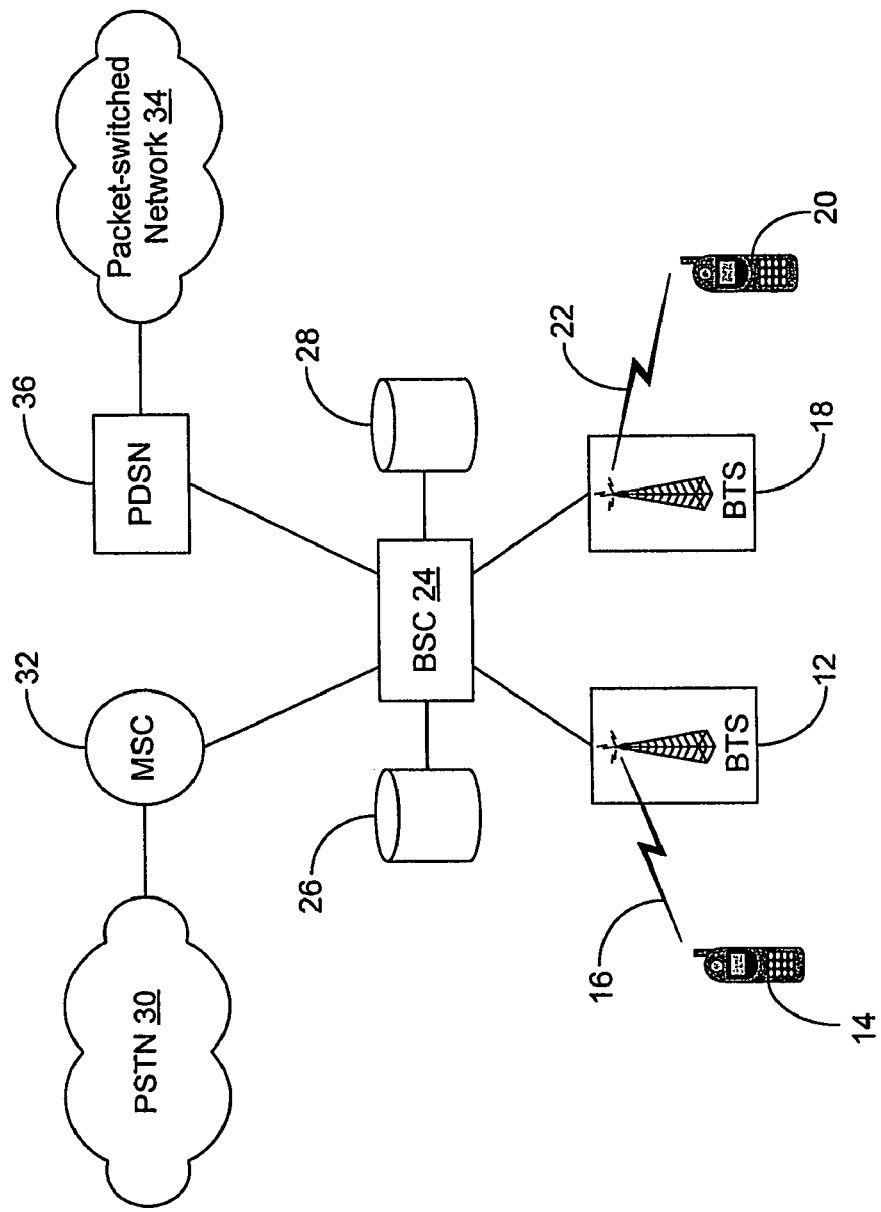
FIG. 1 is a block diagram of a wireless telecommunications network, in accordance with an exemplary embodiment.

The inventors have recognized that the conventional approach of using the same quality-control parameters (such as target FER) and power-control parameters (such as minimum and maximum transmit power levels) for all mobile stations can lead to difficulties. This is because different mobile stations can have different characteristics. For example, different mobile stations can have different receiver sensitivities. A mobile station's receiver sensitivity may determine the minimum signal strength that the mobile station can receive and still be able to decode reliably (e.g., to achieve a specified FER). Thus, mobile stations with less sensitive receivers may need to receive forward link signals at a higher power level than mobile stations with more sensitive receivers in order to achieve the same FER.

To compensate for such differences in receiver sensitivity, a base transceiver station (BTS) may transmit forward link signals at a higher power level for mobile stations with low receiver sensitivity and at a lower power level for mobile stations with high receiver sensitivity. These differences in transmit power levels can result from the operation of conventional "inner loop" and "outer loop" power control processes. However, this conventional approach may be inadequate when the BTS reaches its maximum transmit power level. For example, when a BTS transmits a forward link signal at the maximum transmit power level to a mobile station having a low receiver sensitivity, the signal strength of the received signal might still be too low to achieve the target FER.

In order to address this problem, the inventors propose making one or more quality-control parameters and/or power-control parameters for controlling forward link or reverse link signals dependent on a mobile station's receiver sensitivity. For example, the maximum transmit power level for a forward link signal could be dependent on the receiver sensitivity of the mobile station receiving the forward link signal. In this way, a BTS may allow a higher maximum transmit power level when transmitting to a mobile station with a low receiver sensitivity, so as to be able to achieve the target FER over a wider range of conditions.

It is to be understood, however, that this approach may be subject to resource availability. For example, a BTS may be allocated only a limited amount of transmitter power that can be allocated among transmissions to different mobile stations. As a result, a BTS may not be able to increase the maximum transmit power level for a mobile station that has low receiver sensitivity if the BTS has little or no additional transmitter power available in its allocation due to its transmissions to other mobile stations.

Additional difficulties can arise when a low-sensitivity mobile station is involved in a communication session with another mobile station. In that situation, the quality of the received signal may depend on the overall error rate in the mobile-to-mobile communication. For example, if a first mobile station communications with a second mobile station and a target FER is set at 1%, then the first mobile station may transmit a first reverse link signal with a FER of 1% to a first BTS and a second BTS may transmit a second forward link signal with a FER of 1% to the second mobile station, resulting in an overall FER of 2% for the mobile-to-mobile communication. This means that 2% of the frames transmitted by the first mobile station are either not received at all by the second mobile station (erased frames) or are received with one or more errors (errored frames).

For the case of voice communication, the second mobile station's vocoder may be able to function adequately with an overall FER of 2%. However, if the second mobile station has a low receiver sensitivity, then the target FER of 1% for the second forward link signal may not be achieved. For example, even with the second BTS transmitting the second forward link signal at the maximum transmit power level, the second mobile station may observe a FER of 2% (i.e., 2% of the frames transmitted by the second BTS are either erased or errored). That, in turn, may result in an overall FER of 3% for the mobile-to-mobile communication. With an overall FER of 3% or higher, the voice quality may be noticeably degraded and/or the call may be dropped.

The inventors have recognized that this problem can be addressed by making the target FER for a first reverse link signal transmitted by a first mobile station more stringent when the first mobile station is communicating with a second mobile station that has a low receiver sensitivity. For example, when the second mobile station has a low sensitivity, the target FER for the first mobile station's reverse link signals might be set at 0%, instead of 1%. That way, if the observed FER for the second forward link signal received by the second mobile station is 2%, rather than the target FER of 1%, the overall FER could still be 2% by achieving the target FER of 0% for the first reverse link signals.

Thus, the target FER for the first reverse link signal transmitted by the first mobile station may depend on the receiver sensitivity of the second mobile station. In addition, the target FER for the second forward link signal received by the second mobile station could depend on the second mobile station's receiver sensitivity. For example, if the receiver sensitivity of the second mobile station is low, then the target FER of the first reverse link signal transmitted by the first mobile station could be made more stringent (e.g., 0% instead of a default value of 1%) and the target FER of the second forward link signal received by the second mobile station could be made less stringent (e.g., 2% instead of a default value of 1%), so that the overall FER in the mobile-to-mobile communication may remain 2%. It is to be understood that such adjustments in quality-control parameters (e.g., target FERs) based on receiver sensitivity could be made instead of or in addition to adjustment in power-control parameters (e.g., maximum transmit power levels) based on receiver sensitivity.

A wireless telecommunications network may determine the receiver sensitivity of a mobile station based on the mobile station's electronic serial number (ESN). For example, the network may determine the manufacturer and model of a mobile station from its ESN by referring to commercially available information that identifies which ranges of ESNs have been allocated to which manufacturers and to which models. The network may then identify a sensitivity level of the mobile station based on its manufacturer and model. For example, a particular model of mobile station may be placed in one of a plurality of predetermined sensitivity levels (such as "high," "medium," and "low") based on the manufacturer's specifications for the model and/or test results on the model's receiver sensitivity.

Thus, in an exemplary approach, the network may receive the ESN of a mobile station and determine a sensitivity level of the mobile station based on the ESN. During a communication session involving the mobile station, one or more quality-control parameters and/or power-control parameters for forward link and/or reverse-link signals may be selected based on the mobile station's sensitivity level. For example, the network may classify a mobile station's receiver sensitivity as being "high," "medium," or "low." It is to be understood, however, that a greater or fewer number of sensitivity levels could be used. In this way, a wireless telecommunications network may provide better wireless service to mobile stations that have low sensitivity.

2. Exemplary Network Architecture

FIG. 1 is a simplified block diagram of an exemplary wireless telecommunications network 10, in which exemplary embodiments may be employed. Network 10 includes a plurality of base transceiver stations (BTS) for wireless communication with a plurality of mobile station. As shown in FIG. 1, network 10 includes a first BTS 12 in communication with a first mobile station 14 via a first air interface 16 and a second BTS 18 in communication with a second mobile station 20 via a second air interface 22. Mobile stations 14 and 20 could be wireless telephones, wireless personal digital assistants (PDAs), wirelessly equipped laptop computers, or other wireless communication devices.

The communications over air interfaces 16 and 22 may include forward link signals transmitted by BTSs 12 and 18 and reverse link signals transmitted by mobile stations 14 and 20. For example, mobile stations 14 and 20 may be involved in a communication session in which mobile station 14 transmits a reverse link signal to BTS 12 and receives a forward link signal from BTS 12 via air interface 16 and mobile station 20 transmits a reverse link signal to BTS 18 and receives a forward link signal from BTS 18 via air interface 22.

The format of the wireless communications over air interfaces 16 and 22 may be in accordance with 1xRTT CDMA, EV-DO, GSM, or other air interface specifications. In some cases, air interfaces 16 and 22 may use the same format for wireless communications. Alternatively, the communications over air interfaces 16 and 22 could be in different formats.

BTSs 12 and 18 may be controlled by a base station controller (BSC) 24. As part of this control function, BSC 24 may select quality-control parameters and/or power-control parameters used to control the signal quality and/or transmit power levels of forward link and/or reverse link signals communicated over air interfaces 16 and 22. As described in more detail below, BSC 24 may select one or more of such quality-control parameters and/or power-control parameters based on the receiver sensitivity of mobile station 14 and/or mobile station 20. Alternatively, this control function could be implemented by a controller in BTS 12 and/or BTS 18.

BSC 24 may determine receiver sensitivity levels of mobile stations based on the mobile stations' electronic serial numbers (ESN). For example, BSC 24 may have access to an ESN database 26 that correlates ranges of ESNs with information regarding the manufacturers and models of mobile stations, and BSC 24 may have access to a sensitivity database 28 that characterizes the receiver sensitivities of different models. Thus, to determine the receiver sensitivity of a mobile station, BSC 24 may obtain the mobile station's ESN, access database 26 to determine the mobile station's manufacturer and model based on its ESN, and then access database 28 to determine the receiver sensitivity of the mobile station based on its model. In this way, BSC 24 may identify a sensitivity level of a mobile station, such as "high," "medium," or "low" based on the mobile station's ESN.

It is to be understood that the configuration of ESN database 26 and sensitivity database 28 shown in FIG. 1 is exemplary only. The information contained in databases 26 and 28 could be consolidated in one database, or the information could be programmed into BSC 24 itself. In addition, instead of using a mobile station's ESN, BSC 24 could determine a mobile station's receiver sensitivity in other ways. For example, a mobile station could transmit an indication of its receiver sensitivity or could transmit its model number from which its sensitivity level may be determined.

BSC 24 may support communications between mobile stations served by BTSs 12 and 18. Thus, in a communication session between mobile stations 14 and 20, mobile station 14 may send signals to mobile station 20 via air interface 16, BTS 12, BSC 24, BTS 18, and air interface 22, and mobile station 20 may send signals to mobile station 14 via air interface 22, BTS 18, BSC 24, BTS 12, and air interface 16.

BSC 24 may also support communications between mobile stations and endpoints connected to circuit-switched networks, such as the public switched telephone network (PSTN) and/or packet-switched networks, such as the Internet. For example, BSC 24 may be communicatively coupled to PSTN 30 via a mobile switching center (MSC) 32. Alternatively or additionally, BSC 24 may be communicatively coupled to packet-switched network 34 via a packet data serving node 36. In this way, mobile stations 14 and 20 may exchange voice, data, video, or other media with endpoints, such as landline telephones, via PSTN 26, and/or with endpoints, such as Web servers, e-mail servers, streaming media servers, or gaming servers, via packet-switched network 30.

Although FIG. 1 shows BTSs 12 and 18 both connected to BSC 24, it is to be understood that BTSs 12 and 18 could be connected to different BSCs that are communicatively coupled together via circuit-switched and/or packet-switched networks. In addition, although FIG. 1 shows BSC 24 connected to two BTSs, it is to be understood that BSC 24 could be connected to a greater or fewer number of BTSs.

3. Exemplary Methods

Figure 2:
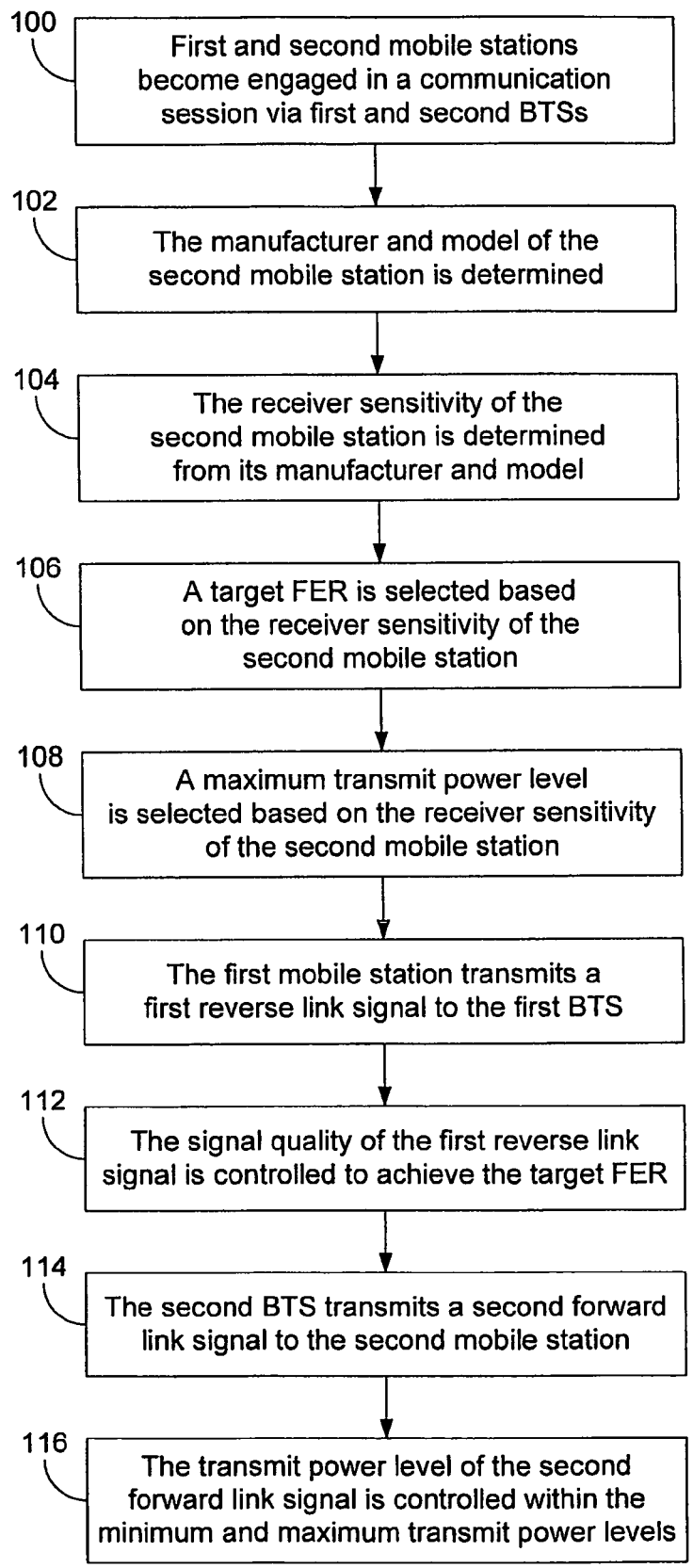
FIG. 2 is a flow chart illustrating a method for selecting a quality-control parameter and a power-control parameter for a communication session, in accordance with an exemplary embodiment.

FIG. 2 is a flow chart illustrating an exemplary method. The method is described with reference to wireless telecommunications network 10 illustrated in FIG. 1. It is to be understood, however, that other network architectures could be used. In addition, the method makes use of a target FER as an example of a quality-control parameter that is selected based on receiver sensitivity and a maximum transmit power level of a power-control parameter that is selected based on receiver sensitivity. However, it is to be understood that other quality-control parameters and power-control parameters could be selected based on receiver sensitivity.

The method may begin when first and second mobile stations (e.g., mobile stations 14 and 20) become engaged in a communication session via first and second BTSs (e.g., BTSs 12 and 18), as indicated by block 100. The communication session could be, for example, a voice call or a data session. During the communication session, the first mobile station transmits a first reverse link signal to the first BTS and receives a first forward link signal transmitted by the first BTS, and the second mobile station transmits a second reverse link signal to the second BTS and receives a second forward link signal transmitted by the second BTS.

In order to select control parameters for the communication session that are appropriate for the second mobile station's characteristics, the manufacturer and model of the second mobile station is determined, as indicated by block 102. This determination may be made by a controller that controls the first BTS and/or the second BTS (e.g., BSC 24). In an exemplary embodiment, the controller makes this determination based on the second mobile station's ESN. For example, the controller may receive the second mobile station's ESN in signaling used to set up the communication session and then query a database (e.g., ESN database) to identify the manufacturer and model that corresponds to that ESN.

The controller may determine the receiver sensitivity of the second mobile station from its manufacturer and model, as indicated by block 104. For example, the controller may query a database (e.g., sensitivity database 28) to identify the receiver sensitivity for that model. The receiver sensitivity may be identified as one of a plurality of predetermined sensitivity levels, such as "high," "medium," or "low." Alternatively, the receiver sensitivity could be characterized in other ways.

The controller may select a target FER (for controlling a signal quality of the first reverse link signal) based on the receiver sensitivity of the second mobile station, as indicated by block 106. For example, if the second mobile station's sensitivity level is "medium," then the controller may select a default value for the target FER (e.g., a target FER of 1%). However, if the second mobile station's sensitivity level is "low," then the controller may select a more stringent value for the target FER (e.g., a target FER of 0%). If the second mobile station has a "high" sensitivity level, the controller may select the default value for the target FER or may select a less stringent value (e.g., a target FER or 2%).

The controller may also select a maximum transmit power level (for controlling a transmit power level of the second forward link signal) based on the receiver sensitivity of the second mobile station, as indicated by block 108. For example, the controller may select a default value for the maximum transmit power level if the second mobile station's sensitivity level is "high" or "medium," but the controller may select a higher maximum transmit power level if the second mobile station's sensitivity is "low."

The quality-control and power-control parameters selected by the controller may then be used to control reverse link and forward link signals. During the communication session, the first mobile station transmits a first reverse link signal to the first BTS, as indicated by block 110. The signal quality of the first reverse link is controlled so as to achieve the target FER that was selected based on the second mobile station's receiver sensitivity, as indicated by block 112. For example, an observed FER in the first reverse link signal received by the first BTS may be determined and compared to the target FER. If the observed FER is greater than the target FER, then the first BTS may cause the first mobile station to increase the power used to transmit the first reverse link signal. If the observed FER is less than the target FER, then the first BTS may cause the first mobile station to decrease the power used to transmit the first reverse link signal.

During the communication session, the second BTS transmits a second forward link signal to the second mobile station, as indicated by block 114. The transmit power level of the forward link signal is controlled within the minimum and maximum transmit power levels, as indicated by block 116. For example, the second mobile station may instruct the second BTS to either increase or decrease the power used to transmit the second forward link signal. In response, the second BTS may adjust the transmit power level of the second forward link signal as instructed by the second mobile station, except that the second BTS will not increase the transmit power level above the maximum transmit power level nor decrease the transmit power level below the minimum transmit power level.

In this way, quality-control and power-control parameters may be adjusted in order to compensate for the second mobile station's receiver sensitivity. Thus, when the second mobile station has a low receiver sensitivity, the signal quality of the first reverse link signal may be increased (by decreasing the target FER) in order to compensate for the possibility that the second mobile station may receive the second forward link signal with a low signal quality due to its low receiver sensitivity. The maximum transmit power level of the second forward link signal may also be increased in order to compensate for the low receiver sensitivity.

Other adjustments could be made based on the second mobile station's receiver sensitivity. For example, if the second mobile station has a low receiver sensitivity, the target FER for the second forward link signal could be increased. More particularly, the target FER for the first reverse link signal and the target FER for the second forward link signal could both be selected based on the second mobile station's receiver sensitivity in order to achieve an overall FER in the mobile-to-mobile communication. Thus, when the second mobile station has a low receiver sensitivity, the target FER for the first reverse link signal could be lowered (made more stringent) and the target FER for the second forward link signal could be increased (made less stringent) so that the overall FER stays the same.

In the example illustrated in FIG. 2, the quality-control and power-control parameters are selected based on the receiver sensitivity of the second mobile station. However, quality-control and/or power-control parameters for the communication session could also be selected based on the receiver sensitivity of the first mobile station. For example, a target FER for the second reverse link signal transmitted by the second mobile station and a maximum transmit power level for the first forward link signal transmitted by the first BTS could be selected based on first mobile station's receiver sensitivity.

Thus, during a communication session involving a first mobile station and a second mobile station, one or more quality-control parameters used to control the signal quality and/or power-control parameters used to control the transmit power levels of forward link and/or reverse link signals may be selected based on a receiver sensitivity of at least one of the first and second mobile stations.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a communication session between a first mobile station and a second mobile station, wherein said first mobile station transmits a first reverse link signal and receives a first forward link signal, and wherein said second mobile station transmits a second reverse link signal and receives a second forward link signal, said method comprising:

determining a receiver sensitivity of said second mobile station;

selecting at least one quality-control parameter based on said receiver sensitivity, wherein said at least one quality-control parameter is used to control a signal quality of said first reverse link signal; and selecting at least one power-control parameter based on said receiver sensitivity, wherein said at least one power-control parameter is used to control a transmit power level of said second forward link signal.

2. The method of claim 1, wherein a first base transceiver station (BTS) transmits said first forward link signal and receives said first reverse link signal, and wherein a second BTS transmits said second forward link signal and receives said second reverse link signal.

3. The method of claim 2, further comprising:

said first BTS controlling said signal quality of said first reverse link signal based on said at least one quality-control parameter.

4. The method of claim 3, wherein selecting at least one quality-control parameter based on said receiver sensitivity comprises:

selecting a target error rate based on said receiver sensitivity.

5. The method of claim 4, wherein said first BTS controlling said signal quality of said first reverse link signal based on said at least one quality-control parameter comprises:

determining an observed error rate in said first reverse link signal received by said first BTS;

comparing said observed error rate to said target error rate;

if said observed error rate is greater than said target error rate, said first BTS causing said first mobile station to increase a transmit power level of said first reverse link signal; and if said observed error rate is less than said target error rate, said first BTS causing said first mobile station to decrease said transmit power level of said first reverse link signal.

6. The method of claim 2, further comprising:
said second BTS controlling said transmit power level of said second forward link signal based on said at least one power-control parameter.

7. The method of claim 6, wherein selecting said at least one power-control parameter based on said receiver sensitivity comprises:
selecting at least one of a minimum transmit power level and a maximum transmit power level based on said receiver sensitivity.

8. The method of claim 7, wherein said second BTS controlling said transmit power level of said second forward link signal based on said at least one power-control parameter comprises:
said second BTS receiving a power control instruction from said second mobile station; and
in response to said power control instruction, adjusting said transmit power level within said minimum transmit power level and said maximum transmit power level.

9. The method of claim 1, wherein determining a receiver sensitivity of said second mobile station comprises:
determining a type of said second mobile station; and
determining said receiver sensitivity based on said type.

10. The method of claim 9, wherein determining a type of said second mobile station comprises:
receiving an electronic serial number (ESN) of said second mobile station; and
determining a manufacturer and model of said second mobile station based on said ESN.

11. The method of claim 9, wherein determining said receiver sensitivity based on said type comprises:
identifying, based on said type, one of a plurality of sensitivity levels as being said receiver sensitivity.

12. The method of claim 11, wherein identifying, based on said type, one of a plurality of sensitivity levels as being said receiver sensitivity comprises:
accessing data that associates different types with different sensitivity levels; and
identifying a sensitivity level associated with said type.

13. A method for a communication session between a first mobile station and a second mobile station, wherein said first mobile station transmits a first reverse link signal and receives a first forward link signal, and wherein said second mobile station transmits a second reverse link signal and receives a second forward link signal, said method comprising:
determining a second-mobile receiver sensitivity of said second mobile station;
selecting a first-reverse-link parameter based on said second-mobile receiver sensitivity; and
controlling a signal quality of said first reverse link signal based on said first-reverse-link parameter.

14. The method of claim 13, wherein said first-reverse-link parameter is a target error rate.

15. The method of claim 14, wherein controlling a signal quality of said first reverse link signal based on said first-reverse-link parameter comprises:
a first BTS receiving said first reverse link signal;
determining an observed error rate in said first reverse link signal received by said first BTS;
comparing said observed error rate to said target error rate;
if said observed error rate is greater than said target error rate, said first BTS causing said first mobile station to increase a transmit power level of said first reverse link signal; and
if said observed error rate is less than said target error rate, said first BTS causing said first mobile station to decrease a transmit power level of said first reverse link signal.

16. The method of claim 13, further comprising:
selecting a second-forward-link parameter based on said second-mobile receiver sensitivity; and
controlling a signal quality of said second forward link signal based on said second-forward-link parameter.

17. The method of claim 16, wherein said second-forward-link parameter is a second target error rate.

18. The method of claim 13, further comprising:
determining a first-mobile receiver sensitivity of said first mobile station;
selecting a second-reverse-link parameter based on said first-mobile receiver sensitivity; and
controlling a signal quality of said second reverse link signal based on said second-reverse-link parameter.

19. A wireless telecommunications network, comprising:
a first base transceiver station (BTS) for transmitting a first forward link signal to a first mobile station and receiving a first reverse link signal from said mobile station during a communication session between said first mobile station and a second mobile station;
a second BTS for transmitting a second forward link signal to said second mobile station and receiving a second reverse link signal from said mobile station during said communication session; and
a controller for controlling at least one of said first and second BTSs, wherein said controller is configured to select, based on a receiver sensitivity of said second mobile station, at least one quality-control parameter for controlling a signal quality of said first reverse link signal.

20. The wireless telecommunications network of claim 19, wherein said controller is further configured to select, based on said receiver sensitivity of said second mobile station, at least one power-control parameter for controlling a transmit power level of said second forward link signal.

21. The wireless telecommunications network of claim 19, wherein said controller is a base station controller (BSC).

* * * * *